US010603845B2

(12) United States Patent
Vaccari

(10) Patent No.: US 10,603,845 B2
(45) Date of Patent: Mar. 31, 2020

(54) MACHINE FOR SEALING PLASTIC PROFILED ELEMENTS

(71) Applicant: Graf Synergy S.r.l., Nonantola (MO) (IT)

(72) Inventor: Andrea Vaccari, Nonantola (IT)

(73) Assignee: Graf Synergy S.r.l., Nonantola (MO) (IT)

( * ) Notice: Subject to any disclaimer, the term of this patent is extended or adjusted under 35 U.S.C. 154(b) by 0 days.

(21) Appl. No.: 16/310,433

(22) PCT Filed: Jul. 5, 2017

(86) PCT No.: PCT/IB2017/054051
§ 371 (c)(1),
(2) Date: Dec. 16, 2018

(87) PCT Pub. No.: WO2018/007958
PCT Pub. Date: Jan. 11, 2018

(65) Prior Publication Data
US 2019/0224923 A1    Jul. 25, 2019

(30) Foreign Application Priority Data
Jul. 7, 2016  (IT) .................................. IT201671193

(51) Int. Cl.
*B32B 37/00*    (2006.01)
*B29C 65/78*    (2006.01)
(Continued)

(52) U.S. Cl.
CPC .......... *B29C 65/7841* (2013.01); *B29C 65/20* (2013.01); *B29C 65/2061* (2013.01);
(Continued)

(58) Field of Classification Search
CPC . B29C 65/7841; B29C 65/20; B29C 66/0224; B29C 66/52431; B29C 66/72523
(Continued)

(56) References Cited

U.S. PATENT DOCUMENTS 5,902,657 A * 5/1999 Hanson ............... B29C 65/0618
428/36.92
7,748,427 B2 * 7/2010 Maruyama .......... B29C 65/7841
156/304.2
8,747,584 B2 * 6/2014 Knapp ................ B29C 65/1412
156/64

FOREIGN PATENT DOCUMENTS

EP       1837163        9/2007

OTHER PUBLICATIONS

International Search Report and the Written Opinion dated Oct. 9, 2017 From the International Searching Authority Re. Application No. PCT/IB2017/054051. (13 Pages).

* cited by examiner

*Primary Examiner* — James D Sells

(57) ABSTRACT

The machine (1) for sealing plastic profiled elements comprises: a base frame (6); retention means (7, 8) of at least a profiled element (P) of plastic material having a first main face (2), a second main face (3), a first lateral face (4), a second lateral face (5) and respective areas to seal (Z), the retention means (7, 8) being associated with the base frame (6) and comprising a first support element (7) movable along a first direction of sliding (A) and a second support element (8) mounted on the first support element (7) and movable relative thereto along a second direction of sliding (B); a heat-sealing element with heated plate (11), having two mutually opposite surfaces on which the areas to seal (Z) to be heated are placeable in contact; sliding means (9, 10) of the retention means (7, 8) adapted to shift the profiled elements (P) between a position of reciprocal moving away and a position of mutual approach wherein the heated areas to seal (Z) are joined together; wherein the machine (1) comprises positioning means (13, 14) associated with the support elements (7, 8) and adapted to receive a portion of (Continued)

one of the lateral faces (4, 5); locking means (15, 28) movably associated with the retention means (7, 8) and adapted to keep the profiled elements (P) in a locking configuration wherein one of the main faces (2, 3) is kept into contact with one of the support elements (7, 8) and one of the lateral faces (4, 5) is arranged into contact with the positioning means (13, 14), and wherein the locking means (15, 28) prevent the profiled elements (P) from rotating around the longitudinal axis of the profiled elements themselves.

11 Claims, 6 Drawing Sheets

(51) Int. Cl.
  *B29C 65/00* (2006.01)
  *B29C 65/20* (2006.01)
  *E06B 3/96* (2006.01)
  *B29L 31/00* (2006.01)
(52) U.S. Cl.
  CPC ...... *B29C 65/2092* (2013.01); *B29C 66/0224* (2013.01); *B29C 66/1162* (2013.01); *B29C 66/322* (2013.01); *B29C 66/326* (2013.01); *B29C 66/52431* (2013.01); *B29C 66/72523* (2013.01); *B29C 66/73921* (2013.01); *E06B 3/9608* (2013.01); *B29C 66/71* (2013.01); *B29L 2031/003* (2013.01); *B29L 2031/005* (2013.01)
(58) Field of Classification Search
  USPC .......................................................... 156/580
  See application file for complete search history.

Fig.1a
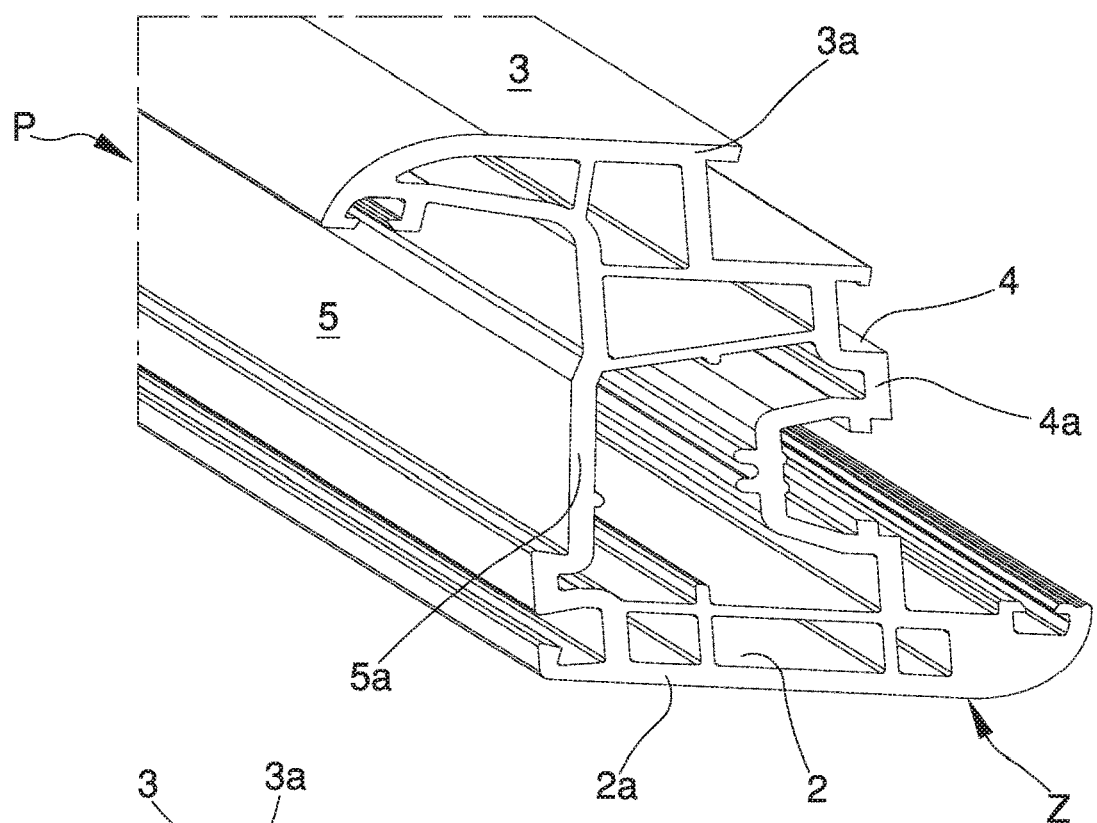
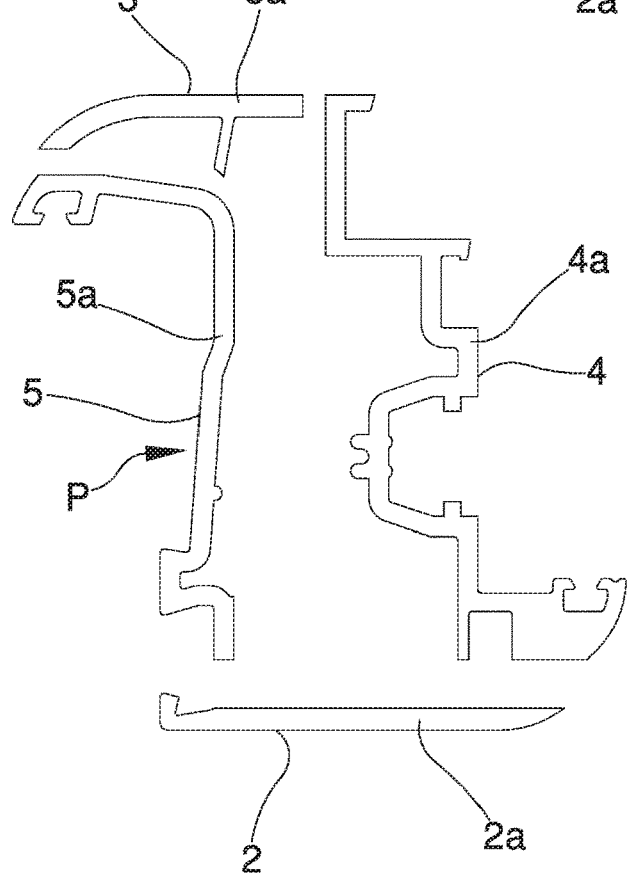
Fig.1b

MACHINE FOR SEALING PLASTIC PROFILED ELEMENTS

RELATED APPLICATIONS

This application is a National Phase of PCT Patent Application No. PCT/IB2017/054051 having International filing date of Jul. 5, 2017, which claims the benefit of priority of Italian Patent Application No. IT201600071193 filed on Jul. 7, 2016. The contents of the above applications are all incorporated by reference as if fully set forth herein in their entirety.

FIELD AND BACKGROUND OF THE INVENTION

The present invention relates to a machine for sealing plastic profiled elements, particularly PVC.

In the state of the art, plastic profiled elements such as PVC or the like, mainly used as frames, are sealed together by melting the respective head surfaces in order to make a surrounding structure which can be fitted to doors, windows or wall frames of same.

In particular, melting is done by heating the portions to be connected by means of suitable heat-sealing plates and then pressing the heated portions the one against the other to facilitate their merger.

Generally, the heated portions are the head ending parts of the profiled elements, suitably cut at 45° to define e.g. a straight corner portion of a respective frame.

This method is implemented by sealing machines equipped with respective retention means of the profiled elements, which are movable in reciprocal approach to bring the heated ending parts to be sealed into contact.

Other machines are furthermore equipped with finishing systems, adapted to remove the sealing seam or bead which forms during the merger of the two profiled elements.

In fact, at the joining line of the two profiled elements (surfaces cut at 45°), the portion of excess melted material comes out and goes to form a bead protruding from the visible surface of the profiled elements which has an ugly appearance as well as nonconformities which can negatively affect the correct installation of the profiled elements themselves.

For this reason, to give the finished frame an appealing appearance and obtain a frame without structural nonconformities, the profiled elements, once sealed, undergo a process of removal of the sealing bead.

Known sealing devices, briefly described above, do however have major drawbacks tied mainly to the formation of the aforementioned sealing bead.

In fact, it must be considered that the sealing area of the plastic profiled elements is not completely uniform and consequently, to make the profiled elements regular, a lot of material is melted with the consequent formation of a large bead, and therefore abundant waste material, which has to be removed.

Furthermore, the finishing operations adapted to remove the bead and clean the sealing area, considerably affect the total frame machining times.

It should be realized in fact that for every frame sealing operation, the profiled elements have to be subsequently machined.

Furthermore, in the case of radial profiled elements the removal of said bead is highly complicated.

To this must be added that the machinery used for the aforementioned finishing operations is cumbersome, complex and particularly expensive.

This involves the need to bear additional costs and processing times, also given the presence of additional cumbersome equipment and tools.

Patent document WO 2013/132406 A1 discloses a method and a device which permit overcoming the aforementioned drawbacks.

The system shown in WO 2013/132406 A1, in fact, is fitted with two movable retention parts on which the profiled elements are mounted and permits sealing them without forming any sealing bead, thanks to a prior milling operation on the areas to seal, adapted to obtain on the profiled elements a containment compartment for the sealing bead, and to the application of containment pressers, which are moved close to the heated profiled elements during sealing and prevent the melted material from coming out of the containment compartment.

An upgraded type of pressing elements is shown in patent document WO 2014/122572 A1. The methods and devices shown on the documents WO 2013/132406 A1 and WO 2014/122572 A1 are also susceptible to further upgrading aimed at obtaining surrounding structures for doors and windows of even better quality.

Such upgrading is aimed at ensuring that, once the head ending parts of the profiled elements have been mutually moved up against one another by means of the movement of the retention means, the profiled elements are interposed between the retention means in a locking configuration such as to prevent the relative rotation of the profiled elements themselves around the relative longitudinal extension axes, or the movement with respect to the reference position in the locking configuration.

It therefore follows that the surrounding structure of the obtained frame is as in conformity as possible and without the structural irregularities particularly evident to the eye.

SUMMARY OF THE INVENTION

The main aim of the present invention is to provide a machine for sealing plastic profiled elements which permits simplifying and making easier the sealing operations of the profiled elements, thus keeping the profiled elements in a fixed position during the sealing of the relative head surfaces, in order to obtain surrounding structures for frames of high aesthetic standard and without structural irregularities due to sudden movements of the profiled elements during the operations of reciprocal moving close of the head surfaces.

In particular, one object of the present invention is to provide a machine for sealing plastic profiled elements which permits sealing any type of profiled element regardless of particular shapes or different types of frames available on the market.

Another object of the present invention is to provide a machine for sealing plastic profiled elements which allows to overcome the mentioned drawbacks of the prior art within the ambit of a simple, rational, easy, effective to use and affordable solution.

The above mentioned objects are achieved by the present machine for sealing plastic profiled elements having the characteristics of claim 1.

BRIEF DESCRIPTION OF THE SEVERAL VIEWS OF THE DRAWINGS

Other characteristics and advantages of the present invention will become more evident from the description of a preferred, but not exclusive, embodiment of a machine for sealing plastic profiled elements, illustrated by way of an indicative, but non-limiting example in the accompanying drawings, wherein:

FIG. 1a is an axonometric view, on an enlarged scale, of a detail of the profiled elements to be sealed with the machine according to the invention;

FIG. 1b is a schematic sectional view of the profiled elements to be sealed with the machine according to the invention;

DESCRIPTION OF SPECIFIC EMBODIMENTS OF THE INVENTION

Figure 1:
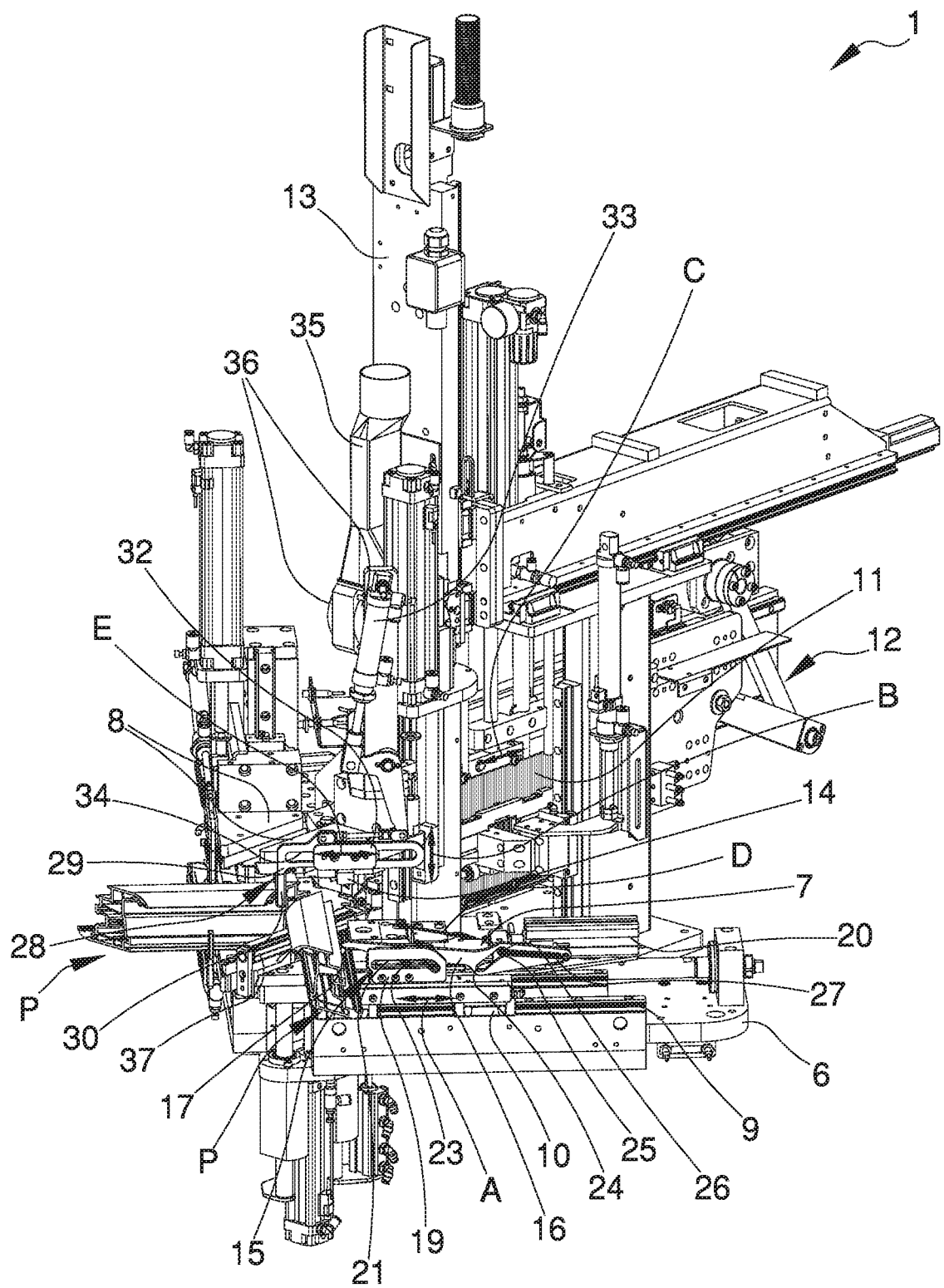
FIG. 1 is an axonometric view of a machine according to the invention.
Figure 2:
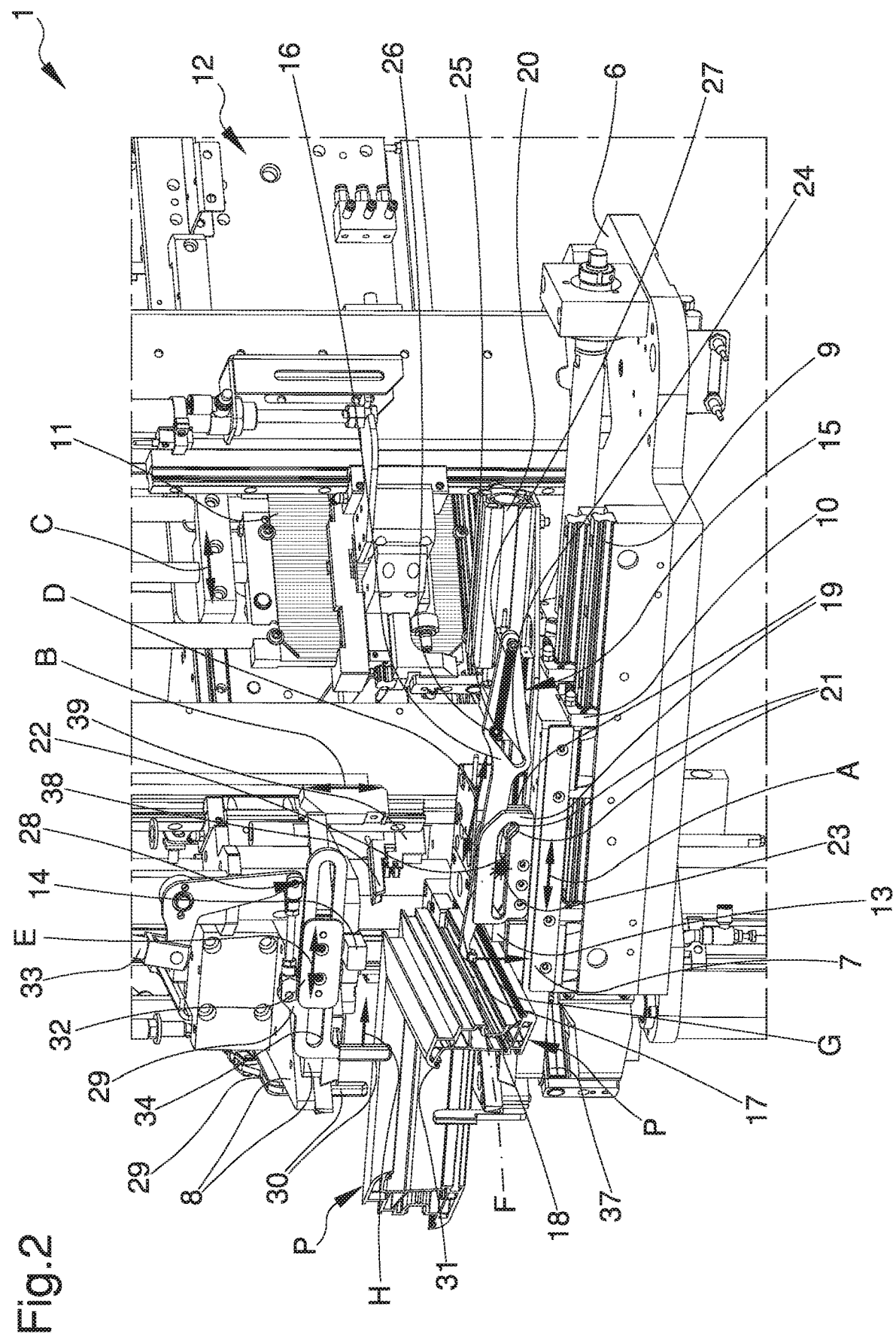
FIG. 2 is an axonometric view, on an enlarged scale, of a detail of the machine according to the invention.
Figure 3:
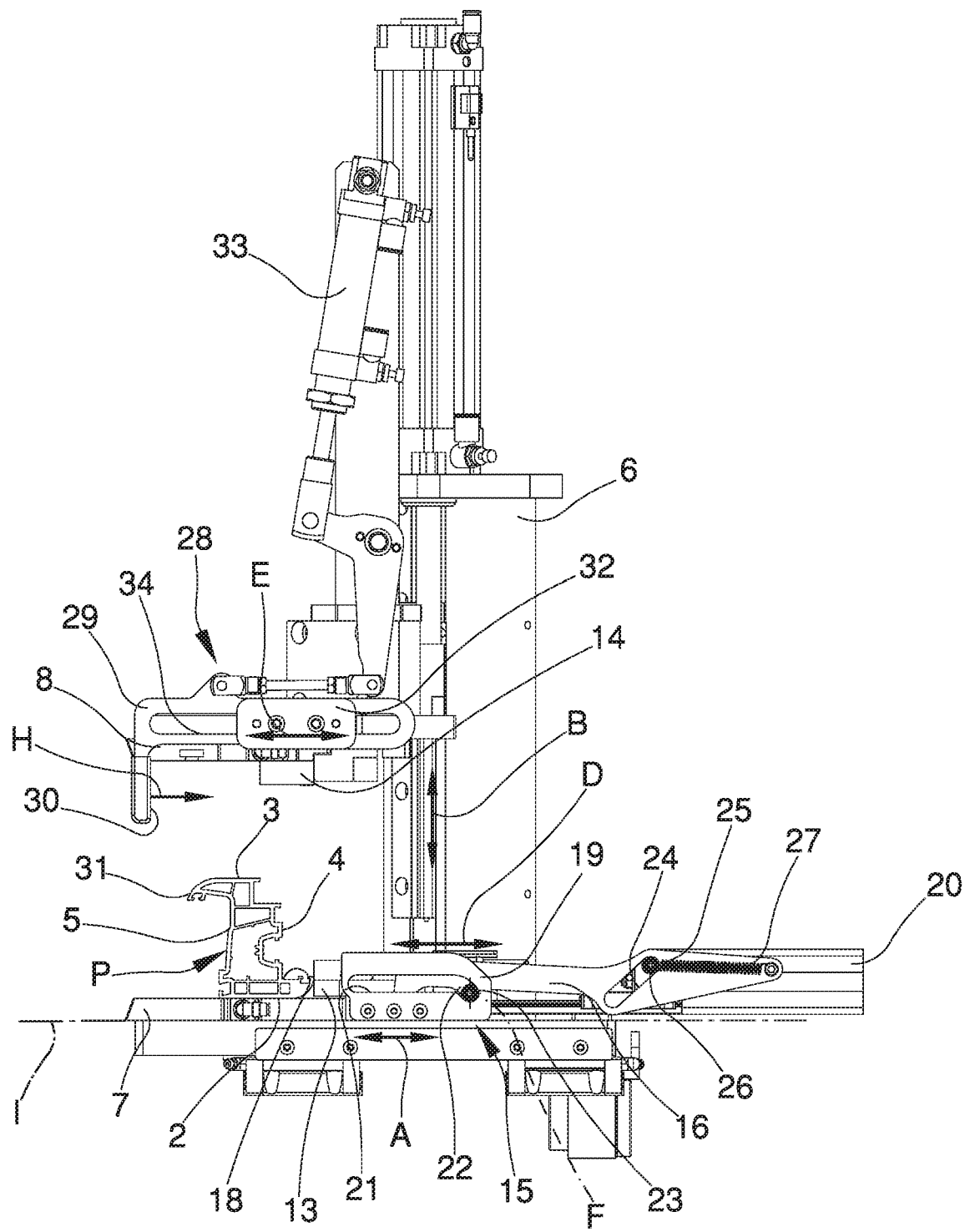
FIGS. 3, 4 and 5 illustrate, in a succession of side views, the movement of the locking means of the profiled elements provided by the machine according to the invention.
Figure 4:
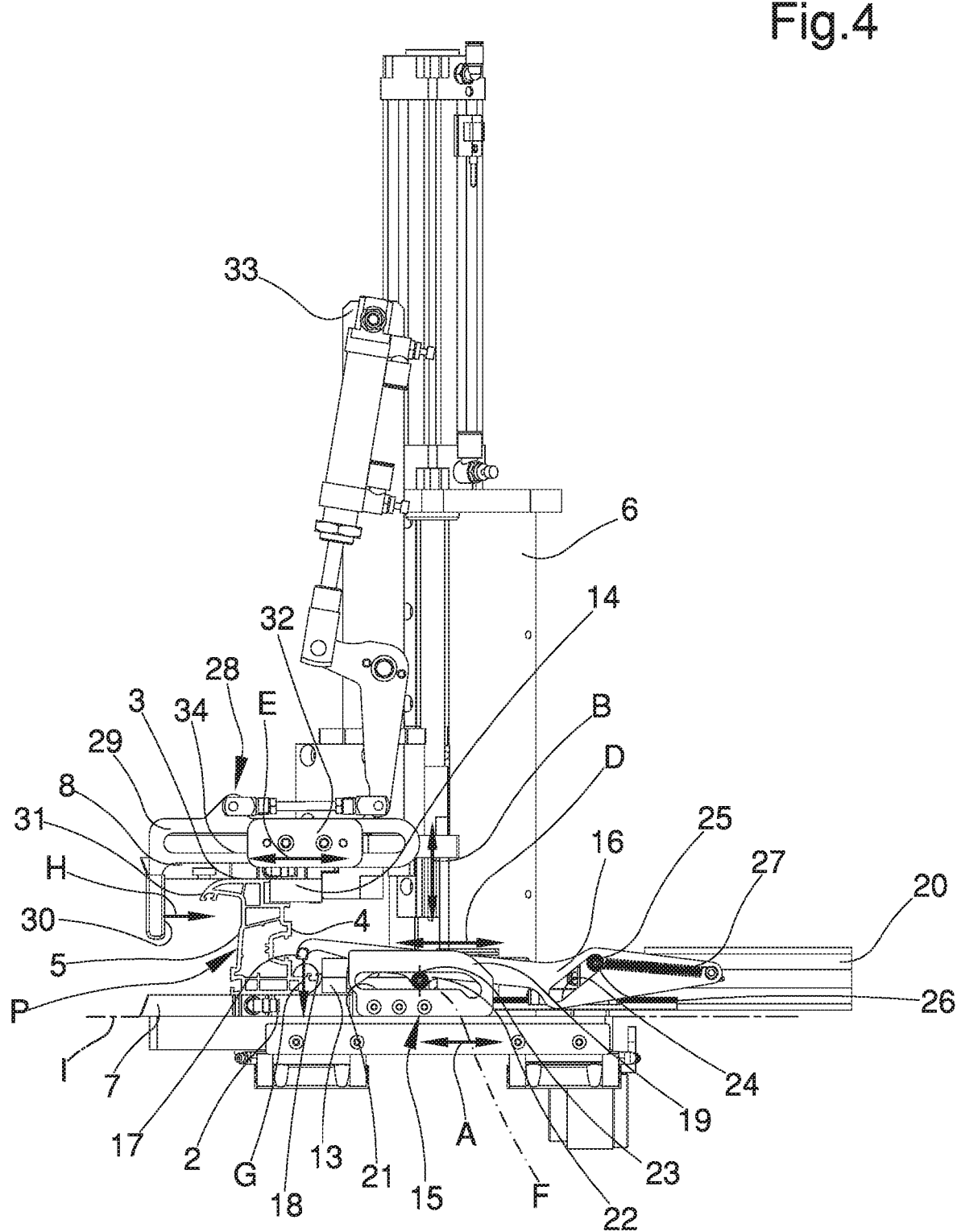
Figure 5:
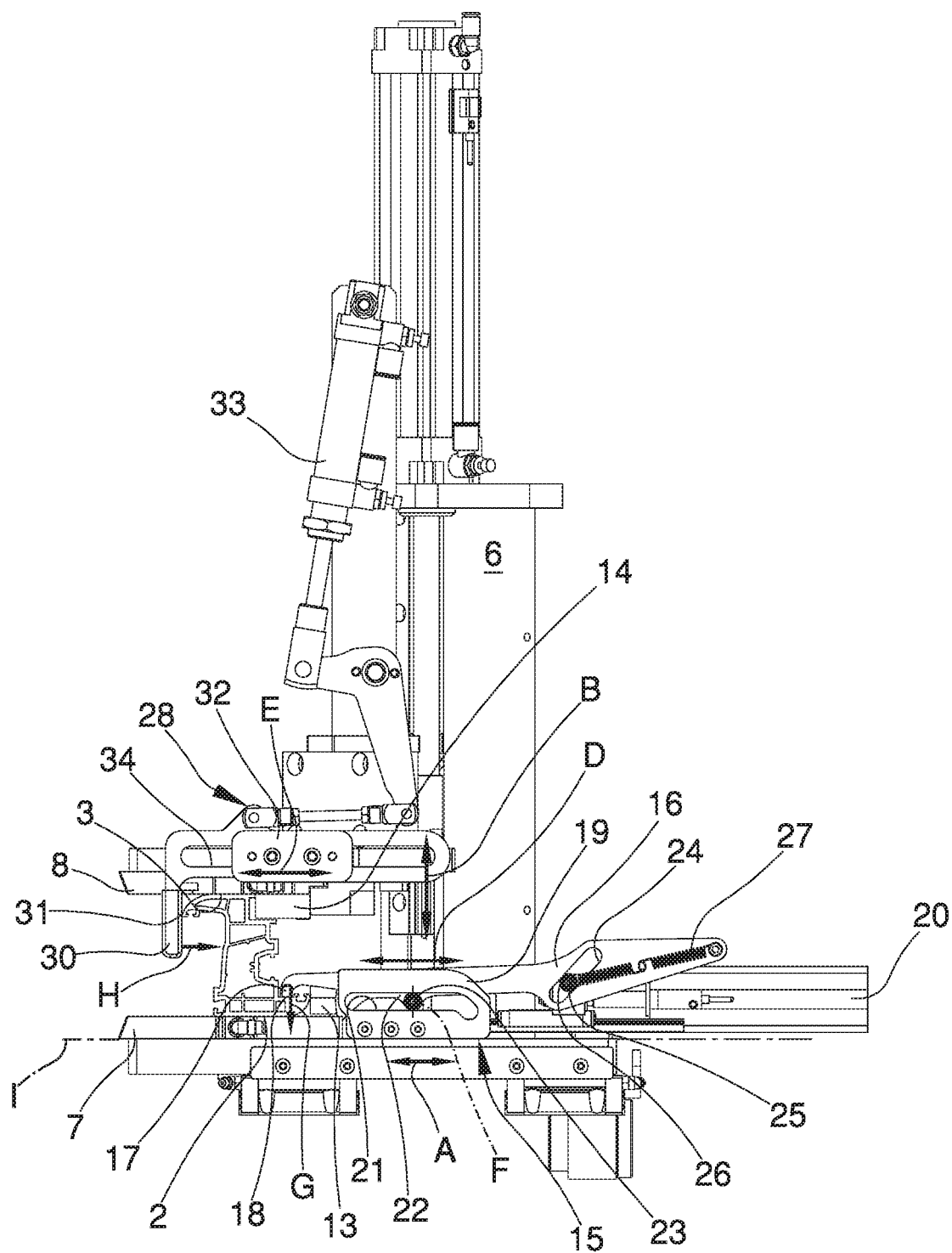

With particular reference to these figures, globally indicated with reference numeral 1 is a machine for sealing plastic profiled elements P.

The plastic materials of which the profiled elements P are made is, e.g., PVC, but plastic materials cannot be ruled out of heat-sealable type other than PVC.

Within this treatise, by the expression plastic profiled elements is meant all the profiled elements made at least partially of plastic.

In other words, the plastic profiled elements can be of the type of profiled elements made entirely of plastic, or can be of the type of profiled elements having portions made of plastic and portions made of different materials including, e.g., metal, wood or the like.

In particular, the profiled elements made at least partially of plastic, and provided with the portions made of material other than plastic, can comprise protruding portions associated, or defined in a single body piece, with the profiled elements themselves, elements for covering the outer surface of the profiled elements or a core, e.g., for reinforcement, housed in the hollow space defined inside the profiled elements.

The profiled elements P are meant to be assembled together to manufacture door or window surrounding structures, but the machine 1 can also be used to assemble the profiled elements of the wall frames of same.

Each profiled element P has a first main face 2, a second main face 3, a first lateral face 4 and a second lateral face 5 which, within the present treatise, must be intended as follows:

- the first main face 2 and the second main face 3 are the faces of the profiled elements P which substantially lie on the plane of the door/window when the surrounding structure is assembled. In practice, these are the "visible" faces of the door/window;
- the first lateral face 4 is the face of the profiled elements P which substantially lies on the outer perimeter of the door/window when the surrounding structure is assembled. In practice, these are the perimeter sides of the door/window which couple to the relative wall frame;
- the second lateral face 5 is the face of the profiled elements P which substantially lies on the inner perimeter of the door/window when the surrounding structure is assembled. In practice, these are the perimeter sides of the door/window which couple to the inner panel made of glass or other material of the door/window itself.

To permit joining by sealing, the profiled elements P have respective areas to seal Z suitably cut at 45° to define a coupling between two profiled elements P at a right angle.

The areas to seal Z have a first main edge 2a, a second main edge 3a, a first lateral edge 4a and a second lateral edge 5a, which correspond to the joining margins of the areas to seal Z with the first main face 2, the second main face 3, the first lateral face 4 and the second lateral face 5, respectively.

In the remainder of the present description, a single machine 1 will be illustrated adapted to seal the ending parts of two respective profiled elements P.

Nevertheless, it is easy to appreciate that the machine 1 can be part of a larger system having a series of machines 1, each of which operating on a respective ending part of a profiled element P.

For example, to make a rectangular surrounding structure usable as a frame, four machines 1 are provided, each designed to seal the profiled elements P at the right angles of the aforementioned surrounding structure.

The machine 1 comprises a base frame 6 which bears a pair of retention means 7, 8 adapted to retain the profiled elements P respectively with the corresponding areas to seal Z facing together.

Each pair of retention means 7, 8 comprises a first support element 7 movable along a first direction of sliding A and a second support element 8 mounted on the first support element 7 and movable relative thereto along a second direction of sliding B substantially transverse to the first direction of sliding A.

Each of the main faces 2, 3 is adapted to come into contact with a respective support element 7, 8.

In particular, the first support element 7 is adapted to receive and support the profiled element P, and more in detail the first main face 2, while the second support element 8 is arranged above the first support element 7 and resting on the second main face 3.

The second support element 8 is suitably vertically moved along the second direction of sliding B to shift towards the first support element 7 and thus retain the profiled element P, arranged horizontally.

Each profiled element P is therefore placed between the first support element 7 and the second support element 8, with the respective head ending part protruding.

The head ending parts of the profiled elements P represent the areas to seal Z and for this reason they are counter-faced.

The machine 1 comprises sliding means 9, 10 of the retention means 7, 8, which are placed between the base frame 6 and the retention means themselves and are adapted to shift the profiled elements P between a position of reciprocal moving away, wherein the areas to seal Z of two profiled elements P are facing and spaced apart from each other, and a position of mutual approach, wherein the heated areas to seal Z are joined together.

In particular, for each of the retention means 7, 8, the sliding means 9, 10 have a sliding guide 9, extending horizontally orthogonally to the longitudinal extension of the profiled element P.

On the sliding guide 9 is mounted a carriage 10 which is locked together with the first support element 7 and is coupled to a movement system, not described in detail, adapted to shift both the carriages 10 of the retention means 7, 8 in a reciprocal approach/moving away direction.

The machine 1 is provided with a heat-sealing element with heated plate 11, mounted on the base frame 6 and having two mutually opposite surfaces on which the areas to seal Z to be heated are placeable in contact.

The heat-sealing element with heated plate 11 is arranged on a substantially vertical lying plane inclined by 45° with respect to the sliding guides 9 parallel to the areas to seal Z.

The heat-sealing element with heated plate 11 is composed, e.g., of an electric heating element which is substantially plate shaped.

The machine 1 comprises at least a shifting assembly 12 which is adapted to shift the heat-sealing element with heated plate 11 along a direction of shifting C between an active condition, wherein the heat-sealing element with heated plate 11 is placed between the profiled elements P, and an inactive condition, wherein the heat-sealing element with heated plate 11 is moved away from the profiled elements P.

It should be noticed, in particular, that when the profiled elements P are arranged by the sliding means 9, 10 in the reciprocal moving away position, they define a transit area for the heat-sealing element with heated plate 11.

This way, once the areas to seal Z have been heated, the profiled elements P are moved closer to one another and pressed with their respective ending part heads one against the other.

In the preferred embodiment shown in the figures, the machine 1 comprises:
 positioning means 13, 14 associated with the support elements 7, 8 and adapted to receive and support at least a portion of at least one of the lateral faces 4, 5; and
 locking means 15, 28 movably associated with the retention means 7, 8 and adapted to keep the profiled elements P in a locking configuration wherein at least one of the main faces 2, 3 is kept into contact with at least one of the support elements 7, 8 and at least one of the lateral faces 4, 5 is arranged into contact with the positioning means 13, 14.

Conveniently, the locking means 15, 28 are adapted to prevent the profiled elements P from rotating around the longitudinal axis of the profiled elements themselves.

The positioning means 13, 14 comprise a first abutment element 13 associated with the first support element 7 and a second abutment element 14 associated with the second support element 8.

Preferably, the abutment elements 13, 14 are the type of bodies with such a shape that each receives and supports at least a respective portion of at least one of the lateral faces 4, 5. More in particular, one of the surfaces of the first abutment element 13 is arranged resting on the first support element 7, while one of the surfaces of the second abutment element 14 is associated with the second support element 8 so that the second abutment element 14 is hanging from the second support element itself and facing the first support element 7.

The abutment elements 13, 14 have a substantially rectangular parallelepiped shape and, as can be seen in the figures, one of the surfaces of the abutment elements 13, 14 is facing the first lateral face of the profiled element P and is substantially vertically orientated with respect to the surface of the first and second support element 7, 8.

The particular conformation of the abutment elements 13, 14 results in one of the surfaces of each of the abutment elements 13, 14 being adapted to receive with full contact a respective portion of the first lateral face 4.

More in detail, the profiled elements P are arranged in a reference configuration wherein a portion of the first main face 2 is arranged on the first support element 7 and a portion of the first lateral face 4, adjacent to the first main face 2, is arranged in contact with the first abutment element 13.

In such reference configuration, the second support element 8 is vertically brought closer to the first support element 7 and a portion of the second main face 3 is contacted by the second support element 8, while at the same time another portion of the first lateral face 4, adjacent to the second main face 3, is arranged in contact with the second abutment element 14.

The abutment elements 13, 14 are selected with dimensions such as to keep the profiled elements P in the desired reference position, according to the particular shape and dimensions of the profiled elements themselves.

Alternative embodiments cannot however be ruled out wherein the profiled elements P have such a shape that the first abutment element 13 and the second abutment element 14 are adapted to receive and support, in the mutual approach configuration, two portions of the second lateral face 5 adjacent to the first main face 2 and to the second main face 3 respectively.

The locking means 15, 28 comprise at least a first locking assembly 15 associated with the first support element 7 and comprising:
 a first kinematic element 16 having a first ending part 17 adapted to come into contact with a first contact area 18 of a lateral face 4, 5 of the profiled element P;
 a first movement guide 19 locked together with the first support element 7 and adapted to guide the first kinematic element 16 along a first direction of movement D;
 a first actuator element 20 connected to the first kinematic element 16 and adapted to move the first kinematic element itself.

In the preferred embodiment shown in the figures, the first kinematic element 16 is an arm element with a substantially elongated shape and is provided with an extremal portion associated with the first actuator element 20.

In particular, the first actuator element 20 is substantially a pneumatic member provided with a cylinder and a piston sliding inside the cylinder along the longitudinal axis of the cylinder itself.

The movement of the first actuator element 20 occurs by means of suitable automatic operating means linked to it, and not described in detail, by means of which the first kinematic element 16 is adapted to maintain the profiled element P in the locking configuration.

Preferably, the first movement guide 19 comprises a pair of specular bodies having a distance between them greater than the thickness of the first kinematic element 16 and associated with the first support element 7.

The first kinematic element 16 is positioned between the pair of specular bodies of the first movement guide 19.

Preferably, each of the specular bodies of the first movement guide 19 has first slots 21 identical and aligned the one with the other, suitably shaped so that the first direction of movement D is substantially a non-rectilinear trajectory along which the first kinematic element 16 is mobile.

The first kinematic element 16 comprises a fastening-on portion 22 provided with a pair of rotating elements 23, which are mounted on opposite sides on the fastening-on portion 22, the latter being fitted with play, in a rotatable way with respect to a relative axis of rotation F, inside the first slots 21 so that the first kinematic element 16 is movable along the first direction of movement D defined by the shape of the first slots themselves.

More in detail, the fastening-on portion 22 is substantially the fulcrum around which the first kinematic element 16 has a degree of freedom of rotation with respect to the axis of rotation F during the movement along the first slot 21 following the operation of the first actuator element 20.

Advantageously, the first kinematic element 16 is provided with a fastening-on seat 24 inside which is fitted with play a fastening-on element 25, provided with an auxiliary rotating element 26, associated with the end portion of the piston of the first actuator element 20.

More in detail, the fastening-on seat 24 is substantially an opening defined in the body of the first kinematic element 16 having an elongated conformation and orientated substantially by 45° with respect to the longitudinal axis of the first kinematic element 16.

The movement of the cylinder of the first actuator element 20 along the longitudinal axis of the first actuator element 20 itself results in such fastening-on element 25 being movable inside the fastening-on seat 24.

The fastening-on element 25 is associated with the first kinematic element 16 by means of elastic return means 27, of the type of a spring or the like, positioned between the fastening-on element 25 and a portion of the first kinematic element 16 opposite the first ending part 17.

Depending on the movement of the piston of the first actuator element 20 along the longitudinal axis of the first actuator element itself, the fastening-on element 25 is sliding along the fastening-on seat 24 and the first kinematic element 16 is sliding along the first direction of movement D by means of the rotating element 23.

In particular, the first locking assembly 15 is switchable between:
  a first gripping configuration, wherein the first ending part 17 is adapted to exert a force along a first direction of pressure G on the first contact area 18 such as to keep at least one of the faces 2, 3, 4, 5 substantially in abutment with at least one of the first support element 7 and the first abutment element 13; and
  a first release configuration, wherein the first ending part 17 is moved away from the first contact area 18.

The first support element 7 lies on a substantially horizontal base plane I and the first direction of pressure G is substantially transverse to the base plane I.

In the preferred embodiment shown in the figures, the first direction of pressure G is substantially orthogonal and vertical with respect to the base plane I.

More in detail, in the first gripping configuration, the first ending part 17 applies a force along the first direction of pressure G on the first contact area 18 such as to maintain a portion of the first lateral face 4 abutted with the first abutment element 13 and a portion of the first main face 2 abutted with the first support element 7.

In the first release configuration, on the other hand, the first ending part 17 is free and moved away from the first contact area 18 and, more in detail, is arranged between the pair of specular bodies of the first movement guide 19.

The switch from first release configuration to first gripping configuration and vice versa provides for an intermediate configuration wherein the fastening-on element 25 is arranged in a substantially median position with respect to the longitudinal extension of the fastening-on seat 24.

In this intermediate configuration, the first kinematic element 16 is movable along the first movement guide 19 in approach to the profiled element P and the rotation of the fastening-on portion 22 around the axis of rotation F results in the first ending part 17 shifting upwards with respect to the position of reference taken up in the release configuration.

The upward movement of the first ending part 17 during the relative approach to the profiled element P results in the first ending part itself being able to arrange itself at the first contact area 18.

The first kinematic element 16 comprises a locator surface which, in the gripping configuration, is arranged in contact with the first abutment element 13 and results in the first ending part 17 being placeable at the first contact area 18.

Once the first ending part 17 is arranged in contact with the first contact area 18, the automatic operating means interrupt the movement of the piston of the first actuator element 20 along the relative longitudinal axis in approach to the profiled element P and the elastic return means 27 are adapted to exert a pulling force such as to keep the portion of the first lateral face 4 in close contact with the first abutment element 13.

In the same way, in the switch from the first gripping configuration to the first release configuration the first automatic operating means are adapted to the movement of the first actuator element 20 so as to push the first ending part towards the profiled element P and shift it upwards from the first contact area 18, before moving it away from the first lateral face 4, taking on first the intermediate configuration and then the first release configuration. Conveniently, the locking means 15, 28 comprise a second locking assembly 28 associated with the second support element 8 and comprising:
  a second kinematic element 29 having a second ending part 30 adapted to come into contact with a second contact area 31 of another of the lateral faces 4, 5;
  a second movement guide 32 locked together with the second support element 8 and adapted to guide the second kinematic element 29 along a second direction of movement E;
  a second actuator element 33 connected to the second kinematic element 29 and adapted to move the second kinematic element 29.

In the preferred embodiment shown in the figures, the second kinematic element 29 is substantially an elongated body which extends along the second direction of movement E and wherein the second ending part 30 has a substantially orthogonal orientation with respect to the second direction of movement E.

The second direction of movement E is substantially straight and horizontal.

The second movement guide 32 comprises a guide body associated with the second support element 8 and a pair of rotating roller elements for the sliding of the second kinematic element 29.

The second kinematic element 29 is provided with a relative second slot 34 which has a longitudinal extension to the second direction of movement E.

Such second slot 34 is fitted onto the second movement guide 32 and the roller elements make the second kinematic element 29 movable along the second direction of movement E.

In the same way as the first actuator element 20, the second actuator element 33 is substantially a pneumatic member provided with a cylinder associated with the base frame 6 and with a piston which is movable with respect to the cylinder and is associated in turn with a mechanical arm, not described in detail, interposed between the piston and the second kinematic element 29.

The second locking assembly 28 is switchable between:
  a second gripping configuration, wherein the second ending part 30 is adapted to exert a force along a second direction of pressure H on the second contact area 31 such as to keep at least one of the faces 2, 3, 4, 5 substantially in abutment with at least one of the second support element 8 and the second abutment element 14; and a second release configuration, wherein the second ending part 30 is moved away from the second contact area 31.

More in detail, the second direction of pressure H is substantially parallel to the second direction of movement E.

In the second gripping configuration, the portion of the first lateral face 4 adjacent to the second main face 3 is arranged in contact with the second abutment element 14.

The switch from the second release configuration to the second gripping configuration results in the second ending part 30 being arranged in contact with the second contact area 31 and exerting on this the force along the second direction of pressure H, which is orientated towards the second abutment element 14.

Once the first and the second locking assembly 15, 28 operate in the first and in the second locking configuration respectively, the profiled element P is kept in the locking configuration and is locked so that relative rotation is prevented around its own longitudinal axis.

The machine 1 is also provided with removing means 35, 36 mounted on the base frame 6 to machine the areas to seal Z before their heating.

The machining carried out by the removing means 35, 36 is such to make:

at least a main groove on the first main edges 2a and/or on the second main edges 3a of the areas to seal Z; and at least a lateral groove on the first lateral edges 4a.

The removing means 35, 36, besides making the main and lateral grooves, can also usefully level the parts of the areas to seal Z not occupied by the grooves themselves.

In practice, the removing means 35, 36 can be made to pass over the substantial totality of the areas to seal Z at different work depths:

at the edges of the areas to seal Z, the work depth of the removing means 35, 36 is greater and such as to define the main and lateral grooves;

at the remaining parts of the areas to seal Z, instead, the work depth of the removing means 35, 36 is less and such as to remove only a small layer of plastic material, enough to flatten and even out the areas to seal Z.

In other words, the removing means 35, 36, besides shaping the grooves, are adapted to even out the walls and correct any cutting errors of the profiled elements P.

The removing means 35, 36 consist e.g. of removing means by milling; alternative embodiments cannot however be ruled out wherein the removing means 35, 36 are of different type and envisage, e.g., one or more hot tips which remove the plastic material by melting, or one or more ultrasonic tips.

The removing means by milling 35, 36 comprise a holding frame 35 placed above the retention means 7, 8, and at least a work tool 36 (a cutter) positionable substantially facing the profiled elements P to work the areas to seal Z.

The work tool 36 is movable between an idle condition, wherein it is not positioned between the profiled elements P, and a work condition, wherein it is positioned between the profiled elements P.

In greater detail, the removing means by milling 35, 36 preferably comprise a pair of work tools 36, each of which has a head active on the peripheral edge of a respective area to be sealed Z.

As shown in the FIG. 1, the work tools 36 are opposite one another and mounted on opposite sides of the holding frame 35 to work at the same time on both the profiled elements P.

The holding frame 35 is both horizontally and vertically movable by means of a system of controlled axes which allows the work tools 36 not only to switch from the home condition to the work condition but also to shift along the areas to seal Z and perform the required operation.

The machine 1 also has pressing means 37 which are mounted on the base frame 6 and adapted to abut on the areas to seal Z at least one of the first main edge 2a and the second main edge 3a for the containment of a main sealing bead.

In particular, in the condition of sealing of the areas to seal Z, i.e., when the profiled elements P are brought into contact and pressed against one another, the purpose of the pressing means 37 is to stem the melted material of the profiled elements P which comes out of the first main faces 2 and/or of the second main faces 3.

Considering the removing means 35, 36 make the main grooves on the first main edges 2a and/or on the second main edges 3a, then the pressing means 37 define, operating in conjunction with the main grooves, a main containment compartment of the main sealing bead.

When the pressing means 37 settle down on the areas to seal Z, in fact, the main sealing bead which forms by the approach of the first main faces 2 and/or the second main faces 3 remains trapped in the main containment compartment, which is substantially closed and delimited by the main grooves and by the pressing means 37.

Usefully, the pressing means 37 comprise at least a containment presser which can be abutted on the main grooves to deviate the main sealing bead towards the lateral walls of the main containment compartment.

The containment presser 37 is movable transversally to the first direction of sliding A to abut on the areas to seal Z during the coupling of the profiled elements P.

The containment presser 37 is vertically movable thanks to suitable movement means, e.g., a mechanical actuator.

The machine 1 also comprises lateral containment means 38, 39, which are mounted on the base frame 6 and adapted to abut on the areas to seal Z at the first lateral edges 4a for the containment of a lateral sealing bead.

More in detail, the lateral containment means 38, 39 comprise at least a V-shaped element 38 made in a single monolithic body and having two sides with a V arrangement which are adapted to abut on at least a portion of the respective first lateral faces 4 of the profiled elements P.

This way, the V-shaped element 38 defines, in collaboration with the lateral grooves, a lateral containment compartment for the lateral sealing bead.

When the V-shaped element abuts on the areas to seal Z, in fact, the lateral sealing bead formed by the approach of the first lateral faces 4 remains trapped in the lateral containment compartment, which is substantially closed and delimited by the lateral grooves and by the V-shaped element 38.

By sectioning the V-shaped element 38 on a horizontal plane, the relative sides with a V arrangement form, to be exact, an angle of 90°, so as to abut perfectly on the first lateral faces 4 which are also arranged at 90°.

In the particular embodiment shown in the figures, the lateral containment means 38, 39 comprise a plurality of V-shaped elements 38, arranged one above the other so as to abut on respective portions of the first lateral edges 4a.

Advantageously, the first lateral edges 4a have a very "irregular" shape, i.e., not flat and consisting of the alternation of various protrusions and recesses which, during the melting of the plastic, may be subject to completely different deformation phenomena; the use of a plurality of V-shaped elements 38 permits more easily adapting the lateral containment means 38, 39 to the various protrusions and recesses of the profiled elements P.

Alternative embodiments of the present invention cannot however be ruled out wherein the V-shaped element 38 is one only and such as to substantially cover the entire extension of the first lateral edges 4a.

It is easy to appreciate that the machine 1 can be equipped with various kits of lateral containment means 38, 39, which differ from one another in terms of the number and shape of the V-shaped elements 38, so as to be able to operate on all the profiled elements P present on the market.

Depending on the type of profiled element P to be sealed, in fact, it is enough to fit on the machine 1 the lateral containment means 38, 39 having the V-shaped element or the V-shaped elements 38 shaped in conformity with the first lateral edges 4a.

The lateral containment means 38, 39 comprise at least a support body 39 which supports the V-shaped elements 38 and which is mounted on the base frame 6 in a movable way for the abutment of the V-shaped elements 38 on the lateral faces of the profiled elements P. Preferably, the machine 1 comprises a movement assembly, not described in detail, adapted to the movement of the lateral containment means 38, 39 at the first lateral edges 4a.

In practice, when the profiled elements P are moved closer one another to melt the areas to seal Z, then the heat-sealing element with heated plate 11 is made to move forwards pushing the support body 39 until the V-shaped elements 38 rest on the profiled elements P.

Usefully, the V-shaped elements 38 are mounted on the support body 39 by interposition of yielding support means adapted to obtain a flexible coupling between the V-shaped elements 38 and the support body 39.

The presence of the yielding support means permits, during sealing, adapting the position of the V-shaped elements 38 to the deformation phenomena of the melted material, ensuring that the sides of the V-shaped elements 38 always maintain in contact with the first lateral faces 4 and that the lateral sealing bead S does not come out of the lateral containment compartment.

It has in practice been ascertained that the described invention achieves the intended objects and in particular the fact is underlined that the machine for sealing plastic profiled elements made this way permits and assures, by means of practical, easy and rapid operations, the correct positioning and locking of the profiled elements arranged with their areas to seal in reciprocal approach for the relative sealing, without the profiled elements turning or moving away from the reference position in which they have to stay for correct sealing.

In other words, by placing both the main faces abutted with the relative support elements and the lateral faces in contact with the abutment elements and the ending parts of the kinematic elements, the profiled elements are locked in a fixed position and their turning around their own longitudinal axis is prevented.

What is claimed is:

1. Machine (1) for sealing plastic profiled elements, comprising:
    at least a base frame (6);
    retention assemblies (7, 8) retaining at least a profiled element (P) of plastic material having a first main face (2), a second main face (3), a first lateral face (4), a second lateral face (5) and respective areas to seal (Z), said retention assemblies (7, 8) being associated with said base frame (6) and comprising at least a first support element (7) movable along a first direction of sliding (A) and at least a second support element (8) mounted on said first support element (7) and movable relative thereto along a second direction of sliding (B) substantially transverse to said first direction of sliding (A), said main faces (2, 3) being adapted to come into contact with said support elements (7, 8) respectively;
    at least a heat-sealing element with heated plate (11), mounted on said base frame (6) and having two mutually opposite surfaces on which said areas to seal (Z) to be heated are placeable in contact;
    sliding assembly (9, 10) of said retention assemblies (7, 8), which are placed between said base frame (6) and said retention assemblies (7, 8) and are adapted to shift said profiled elements (P) between a position of reciprocal moving away and a position of mutual approach wherein said heated areas to seal (Z) are joined together;
    positioning assemblies (13, 14) associated with said support elements (7, 8) and adapted to receive and support at least a portion of at least one of said lateral faces (4, 5);
    locking assemblies (15, 28) movably associated with said retention assemblies (7, 8) and adapted to keep said profiled elements (P) in a locking configuration wherein at least one of said main faces (2, 3) is kept into contact with at least one of said support elements (7, 8) and at least one of said lateral faces (4, 5) is arranged into contact with said positioning assemblies (13, 14), in said locking configuration said locking assemblies (15, 28) being adapted to prevent said profiled elements (P) from rotating around the longitudinal axis of the profiled elements themselves, by exerting clamping forces on said profiled elements in both vertical direction and horizontal direction.

2. Machine (1) according to claim 1, wherein said positioning assemblies (13, 14) comprise at least a first abutment element (13) associated with said first support element (7) and at least a second abutment element (14) associated with said second support element (8), each of said abutment elements (13, 14) being adapted to receive and support at least a respective portion of at least one of said lateral faces (4, 5).

3. Machine (1) according to claim 1, wherein said locking assemblies (15, 28) comprise at least a first locking assembly (15) associated with said first support element (7) and comprising:
    at least a first kinematic element (16) having at least a first ending part (17) adapted to come into contact with at least a first contact area (18) of at least a lateral face (4, 5) of said profiled element (P);
    at least a first movement guide (19) locked together with said first support element (7) and adapted to guide said first kinematic element (16) along a first direction of movement (D);
    at least a first actuator element (20) connected to said first kinematic element (16) and adapted to move said first kinematic element (16).

4. Machine (1) according to claim 3, wherein:
said positioning assemblies (13, 14) comprise at least a first abutment element (13) associated with said first support element (7) and at least a second abutment element (14) associated with said second support element (8), each of said abutment elements (13, 14) being adapted to receive and support at least a respective portion of at least one of said lateral faces (4, 5); and said first locking assembly (15) is switchable between:
- a first gripping configuration, wherein said first ending part (17) is adapted to exert a force along a first direction of pressure (G) on said first contact area (18) such as to keep at least one of said faces (2, 3, 4, 5) substantially in abutment with at least one of said first support element (7) and said first abutment element (13);
- a first release configuration, wherein said first ending part (17) is moved away from said first contact area (18).

5. Machine (1) according to claim 4, wherein said first support element (7) lies on a substantially horizontal base plane (I) and said first direction of pressure (G) is substantially transverse to said base plane (I).

6. Machine (1) according to claim 1, wherein said locking assemblies (15, 28) comprise at least a second locking assembly (28) associated with said second support element (8) and comprising:
- at least a second kinematic element (29) having at least a second ending part (30) adapted to come into contact with at least a second contact area (31) of another of said lateral faces (4, 5);
- at least a second movement guide (32) locked together with said second support element (8) and adapted to guide said second kinematic element (29) along a second direction of movement (E);
- at least a second actuator element (33) connected to said second kinematic element (29) and adapted to move said second kinematic element (29).

7. Machine (1) according to claim 6, wherein:
said positioning assemblies (13, 14) comprise at least a first abutment element (13) associated with said first support element (7) and at least a second abutment element (14) associated with said second support element (8), each of said abutment elements (13, 14) being adapted to receive and support at least a respective portion of at least one of said lateral faces (4, 5); and
said second locking assembly (28) is switchable between:
- a second gripping configuration, wherein said second ending part (30) is adapted to exert a force along a second direction of pressure (H) on said second contact area (31) such as to keep at least one of said faces (2, 3, 4, 5) substantially in abutment with at least one of said second support element (8) and said second abutment element (14);
- a second release configuration, wherein said second ending part (30) is moved away from said second contact area (31).

8. Machine (1) according to claim 7, wherein said second direction of pressure (H) is substantially parallel to said second direction of movement (E).

9. Machine (1) according to claim 1, wherein said machine (1) comprises at least a shifting assembly (12) adapted to shift said heat-sealing element with heated plate (11) along a direction of shifting (C) between an active condition, wherein said heat-sealing element with heated plate (11) is placed between said profiled elements (P), and an inactive condition, wherein said heat-sealing element with heated plate (11) is moved away from said profiled elements (P).

10. Machine (1) according to claim 1, wherein said machine (1) comprises removing assemblies (35, 36) mounted on said base frame (6) and adapted to the machining of said areas to seal (Z) for the removal of material, said removing assemblies (35, 36) being adapted to make at least a main groove on said areas to seal (Z).

11. Machine (1) according to claim 10, wherein said machine (1) comprises pressing assemblies (37), which are mounted on said base frame (6) and adapted to abut on said areas to seal (Z) for the containment of a main sealing bead, said pressing assemblies (37) defining, in cooperation with said main grooves, a main containment compartment of said main sealing bead.

* * * * *